United States Patent

Bakx

[11] Patent Number: 5,844,865
[45] Date of Patent: Dec. 1, 1998

[54] SYSTEM FOR STORING AND REPRODUCING INFORMATION FROM A DISC SHAPED INFORMATION CARRIER

[75] Inventor: Johannus L. Bakx, Eindhoven, Netherlands

[73] Assignee: U.S. Philips Corporation, New York, N.Y.

[21] Appl. No.: 629,303

[22] Filed: Apr. 8, 1996

[30] Foreign Application Priority Data

Apr. 28, 1995 [EP] European Pat. Off. .............. 95201101
May 29, 1995 [EP] European Pat. Off. .............. 95201398

[51] Int. Cl.$^6$ ....................................................... G11B 7/00
[52] U.S. Cl. ................................................ 369/47; 369/50
[58] Field of Search ........................... 369/47, 48, 44.13, 369/44.26, 50, 58, 59, 124, 275.3, 275.4

[56] References Cited

U.S. PATENT DOCUMENTS

| | | | |
|---|---|---|---|
| 4,321,621 | 3/1982 | Kinjo et al. | 369/43 |
| 4,688,205 | 8/1987 | Abiko | 369/59 |
| 4,689,778 | 8/1987 | Miura et al. | 369/40.28 |
| 4,807,211 | 2/1989 | Getreuer | 369/44.13 |
| 4,871,903 | 10/1989 | Carrell | 369/58 |
| 4,901,300 | 2/1990 | Van Der Zande et al. | 369/47 |
| 5,119,363 | 6/1992 | Satoh et al. | 369/50 |
| 5,187,699 | 2/1993 | Raaymakers et al. | 369/48 |
| 5,418,764 | 5/1995 | Roth et al. | 369/47 |
| 5,568,459 | 10/1996 | Takamori et al. | 369/47 |

*Primary Examiner*—Thang V. Tran
*Attorney, Agent, or Firm*—Edward Blocker

[57] ABSTRACT

The disclosed system includes a disc-shaped information carrier and an apparatus for reading and writing information blocks in a continuous track. For indicating the track, the information carrier has a servotrack in which a winding number is encoded per track winding. A winding number and an angular position can be determined from the address of an information block. The angular position is given relative to a reference angular position. This reference angular position is determined by one or more reference marks which are written on the information carrier prior to the first information block. The actual angular position is determined by counting the time relative to a known rotation time from the reading of a reference mark onwards. One or more pulses, for example tachopulses, are generated per revolution in the apparatus. The location of the reference angular position is determined relative to the pulses by reading a reference mark and, subsequently, the actual angular position can be derived from the pulses.

14 Claims, 3 Drawing Sheets

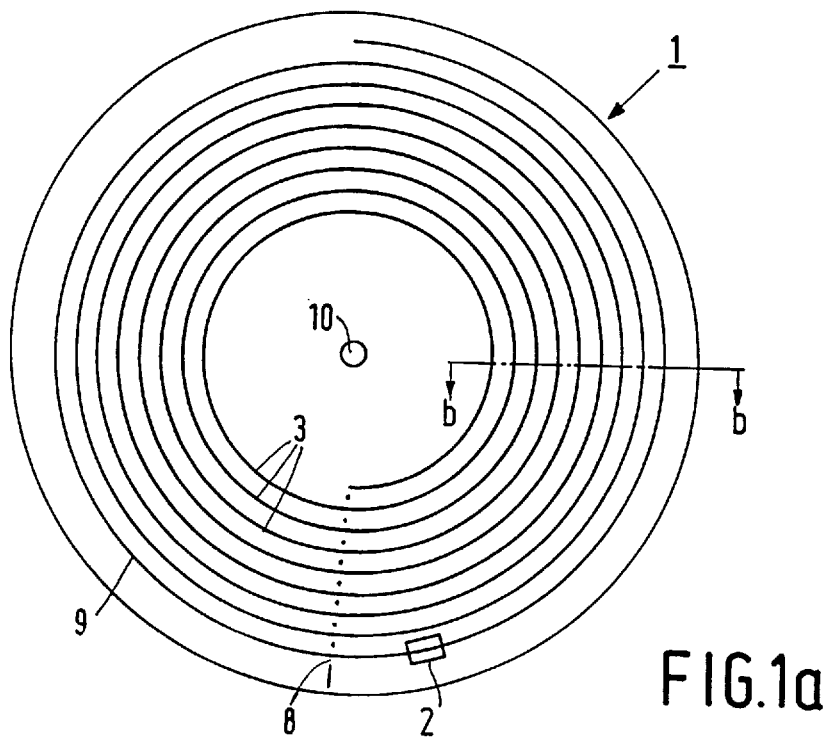
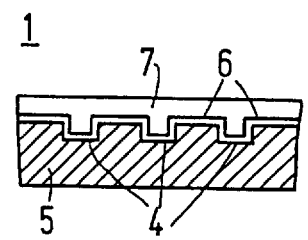
FIG.1b
FIG.1a
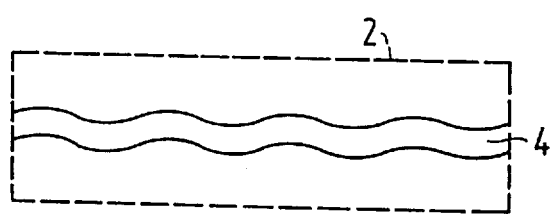
FIG.1c
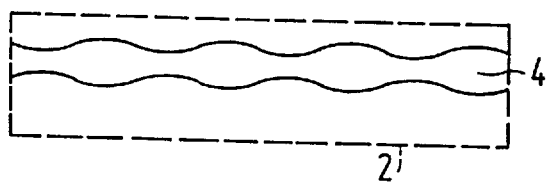
FIG.1d

— 5,844,865 —

SYSTEM FOR STORING AND REPRODUCING INFORMATION FROM A DISC SHAPED INFORMATION CARRIER

BACKGROUND OF THE INVENTION

The invention relates to a system for storing and reproducing information, comprising a disc-shaped information carrier and an apparatus comprising reading/writing means for reading and writing information blocks on a continuous track intended for recording, which track is arranged according to a helical or concentric pattern of windings and is determined by a servotrack on the information carrier, which apparatus comprises driving means for causing the information carrier to rotate, and a read/write head for scanning the track, and which servotrack has a periodic modulation in which disc information is encoded.

The invention further relates to an information carrier to be used in such a system and to an apparatus for reading and writing information blocks to be used in such a system.

The invention further relates to a method of writing a reference mark on an information carrier and to a method of writing information blocks on a record carrier.

A system of the type defined in the opening paragraph, comprising an information carrier and an apparatus for reading and writing information, is known from U.S. Pat. No. 4,901,300. The information is encoded into an information signal which includes time information and may be subdivided in accordance with this time information into addressable information blocks, such as with CD-ROM. The information carrier has a pregroove for causing servotrack signals to be developed, and the radial position of which pregroove periodically varies in accordance with a so-called wobble. During the scanning of the track, this wobble leads to a modulation in the servotrack signals. This modulation comprises modulation-encoded synchronization symbols and position information, which position information indicates the absolute length of the track from the start. During recording, the time/address information is synchronized as much as possible with the synchronization symbols, so that the information blocks are written on the information carrier at a desired position in accordance with their address.

A problem of such a system is that the pregroove wobble signal is modulated with a relatively low frequency and that it is hard to derive therefrom with great accuracy and little delay the position of the read/write head as well as the instants of occurrence of the synchronization symbols. In addition, the pregroove wobble signal is modulated with little intensity and, therefore, sensitive to disc flaws. No measures have been taken to correct errors which occur when the position information is derived. Neither is it possible during a jump to a desired information block to determine exactly how many times the track is to be crossed, because only the distance from an information block to the start of the track is known.

SUMMARY OF THE INVENTION

It is an object of the invention, for example, to provide a system which comprises a reading/writing apparatus and an information carrier, in which system the position of an information block can be determined in a reliable, rapid and accurate manner.

According to a first aspect of the invention a system for storing and reproducing information, as defined in the opening paragraph, is characterized in that the disc information comprises winding information in windings which identifies each particular winding of the track. The apparatus comprises reading/writing means for reading and writing through the read/write head at least a first reference mark on the information carrier, which reference mark is indicative of the location of a reference angular position, and determining means for determining an actual angular position relative to the reference angular position. The reading/writing means are adapted for positioning the read/write head in a radial direction as a function of the winding information, and for effecting the start of the reading or writing operation in dependence on the actual angular position.

The invention is advantageous in that the actual angular position is always available with great accuracy, even if the read signal and/or the servotrack signal is temporarily interrupted due to a damaged information carrier or a jump of the read/write head. As the apparatus, according to the invention, processes the reference marks by the same read/write head as the information blocks, a high position accuracy of the information blocks relative to the reference mark can be achieved in a simple manner. Writing is not affected by disturbances in the pregroove signal because, prior to the writing operation, the winding information needs to be decoded to verify the radial position. The information carrier can be manufactured in a simple manner because it need not comprise an accurately positioned pattern of address information or synchronization symbols.

An embodiment for the system according to the invention is characterized in that the reading/writing means for reading and writing the reference mark are adapted to reading and writing various reference marks on the information carrier. Each reference mark comprises information indicating the position of that particular reference mark relative to the reference angular position. This embodiment is advantageous in that in the event of damage to the information carrier, which renders the first reference mark illegible, one of the other reference marks can be used. This provides a high reliability of information reproduction despite the damage to the information carrier.

A further embodiment for the system according to the invention is characterized in that the reading/writing means for reading and writing the reference mark is adapted for reading and writing reference blocks separately from the reference marks, which reference blocks comprise information indicating the position of the reference marks relative to the reference angular position. This embodiment is advantageous in that once the reference marks have been written, the position of the remaining marks relative to the first mark can be determined very accurately. Subsequently, this information is separately written in the reference blocks on the information carrier. As a result, when the remaining reference marks are used, the reference angular position is known with substantially the same accuracy.

A further embodiment for the system according to the invention is characterized in that the information blocks contain a header stating a block number which uniquely identifies that particular information block. The apparatus comprises determining means for determining a position of that particular information block on the information carrier, that is to say, a winding and an angular position, in dependence on the block number. By providing a continuous series of block numbers, the physical location of the information blocks on the information carrier need not be known.

A further embodiment for the system according to the invention is characterized in that the reading/writing means for reading and writing the information blocks are adjusted to the writing of lead-in symbols prior to the information blocks and for tuning the reading means in dependence on the lead-in symbols prior to the reading of that particular information block. Consequently, the reading means are always tuned on the basis of lead-in symbols written during a writing operation of that particular information block and is especially important if the blocks have been written, for example, on different recording apparatus.

According to a second aspect of the invention, an information carrier of the type defined in the opening paragraph is characterized in that the disc information comprises winding information in windings which identifies each particular winding of the track. The position in a radial direction relative to the point of rotation is known exactly. As a result, there can be verified in a simple manner whether the correct winding has been reached when an information block in another part of the information carrier is skipped to.

The information carrier according to the invention is characterized by the modulation period for a certain part of the servotrack increasing proportionally to the distance from the point at which the information carrier rotates. Advantageously the modulation frequency in the servotrack signal at a constant angular velocity is independent of the spot where the read/write head is located.

A further embodiment for the information carrier according to the invention is characterized in that the winding information contains various independently decodable winding information frames per winding, while a winding information frame contains a winding number uniquely identifying that particular winding, and an angle number indicating an angular position of that particular winding information frame. A correspondence of angle numbers exists in winding information frames whose angular positions correspond. This embodiment is advantageous in that despite local damage to the information carrier, the winding number can nevertheless be read. The angle number is important for a helically arranged track, because the reference angular position may be selected substantially equal to the angular position at which the winding number changes. This angular position may be simply derived from the angle number.

A further embodiment for the information carrier according to the invention is characterized in that the information carrier carries one or more reference marks which reference marks are indicative of the location of a reference angular position. This embodiment is advantageous in that the information carrier can be used in a simple reading and writing apparatus that does not include writing means for writing reference marks.

In yet another embodiment, the information carrier according to the invention is characterized by an information track that is representative of one or more information blocks. This embodiment is advantageous in that part of the information carrier may be provided with information beforehand by a manufacturer, while at a later stage the user can add information thereto.

According to a third aspect of the invention, an apparatus of the type mentioned in the opening paragraph is characterized in that the apparatus comprises reading/writing means for reading and writing by the read/write head at least a first reference mark, which reference mark is indicative of the location of a reference angular position, and determining means for determining an actual angular position relative to the reference angular position. The reading/writing means are adapted for positioning the read/write head in a radial direction in dependence on the winding information and for causing the reading or writing to start in dependence on the actual angular position. This system is advantageous in that a high degree of accuracy at the start of the writing operation can be achieved because the reference marks are read with the read/write head. Subsequent to a jump, the writing of information blocks may be started rapidly by merely verifying whether the correct winding has been reached.

A further embodiment for the apparatus according to the invention is characterized in that the apparatus comprises generating means for generating one or more pulses per rotation and in that the determining means for determining the actual angular position are adapted to determining the actual angular position in dependence on a reference mark and the pulses. The reference mark has to be read out only once after the start of the rotary movement, so that, thereafter, the time relation between the pulses and the reference angular position is known. The actual angular position may then be simply determined, for example, by counting the time after the pulses.

In still another embodiment, the apparatus according to the invention is characterized by control means for controlling the writing velocity in dependence on the winding information, so that the information blocks are written with a constant information density. This embodiment is advantageous in that a maximum amount of information can be written on the information carrier with a high degree of accuracy of the actual angular position, because the angular velocity remains constant.

According to a fourth aspect of the invention a method of recording and reading a reference mark on an information carrier, according to the invention, is characterized in that one or more reference marks are written at a given position relative to the servotrack, which reference marks can be read by reading means for reading reference blocks from the information carrier. Consequently, the information carrier can be used in a simple reading/writing apparatus that does not include writing means for writing reference marks.

In a fifth aspect of the invention, a method of writing information blocks on an information carrier according to the invention is characterized in that the information blocks are radially positioned as a function of the servotrack and in angular orientation as a function of reference marks, which reference marks can be read by reading means for reading information blocks from the information carrier. The method is advantageous in that an information carrier can be used in a simple reading apparatus for solely reading information blocks, which apparatus does not comprise writing means for writing information blocks and/or reading/writing reference marks.

BRIEF DESCRIPTION OF THE DRAWINGS

These and other aspects of the invention will be apparent from and elucidated with reference to the embodiments described hereinafter in conjunction with the drawings, in which:

FIGS. 1a–d show an information carrier with a pregroove;

DESCRIPTION OF THE PREFERRED EMBODIMENTS

Figure 2:
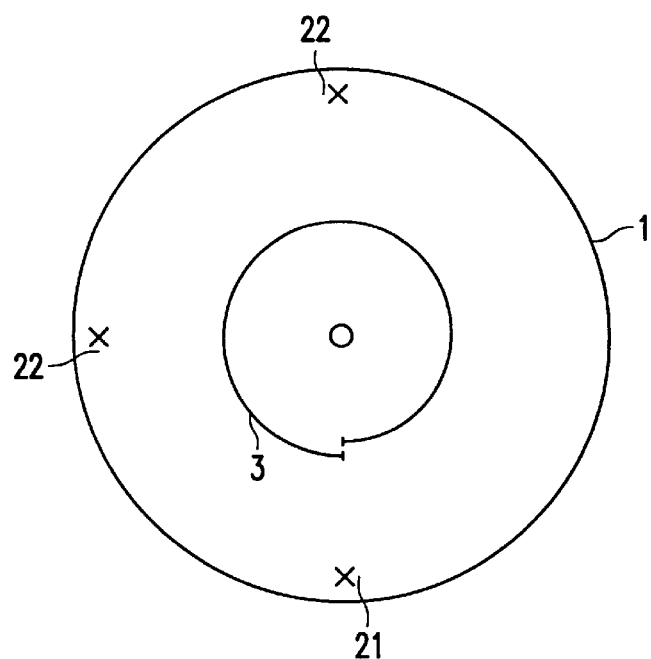
FIG. 2 shows an information carrier with reference marks.

FIG. 1a shows a disc-shaped information carrier 1 which comprises a continuous track 9 intended for recording, which track is arranged in a helical pattern of windings 3. The windings may also be arranged concentrically instead of helically. The track 9 on the information carrier is indicated by a servotrack in which, for example, a pregroove 4 enables a read/write head during scanning to follow the track 9. A servotrack may also be formed, for example, by regularly spread sub-tracks which, in the servotrack system, periodically cause signals to occur. FIG. 1b shows a cross-section along a line b—b of the information carrier 1, in which a substrate 5 is covered by a recording layer 6 and a transparent layer 7. The pregroove 4 may also be arranged as a land or be a material property that differs from its environment. The recording layer 6 may be deposited in optical manner, magneto-optical or magnetic manner by an apparatus for reading and/or writing information such as the known CD recordable or hard disc for computer use. A description of the reading of a CD and the use of a pregroove can be found in the title "Principles of optical disc systems" by Bouwhuis et al., ISBN 0-85274-785-3. FIGS. 1c and 1d show two examples of a periodic modulation (wobble) of the pregroove within a portion 2 of carrier 1. This wobble causes an additional signal to arise in a servotrack recorder. The wobble is, for example, frequency modulated and disc information is modulation encoded. A comprehensive description of the inscribable CD system comprising disc information obtained in such a manner can be found in U.S. Pat. Nos. 4,901,300 and 5,187,699.

On the information carrier according to the invention, each winding 3 in the area intended for recording contains winding information. Each winding 3 accommodates a unique code which indicates, for example, the radial position of the winding. A simple example of such a code is a winding number, counting up, for example, from 0 from the innermost winding outwards. The winding information may also contain a distance to the point of rotation. To decode the winding information, it is advantageous if the modulation of the pregroove has such a pattern that a constant frequency, irrespective of the radial position is developed during reading. A modulated signal having a constant frequency may very well be freed from disturbing signals by a simple filter. For this purpose, the period of the space modulation preferably increases proportionally to the distance to the point of rotation 10. As a result, a constant modulation frequency is developed when the information carrier has a constant angular velocity. It is also possible that a different pattern of the space modulation period and a linked pattern of the angular velocity is selected, for example, a decrease of the angular velocity with an increasing radial distance to the point of rotation 10. This confines the difference between the top and bottom information rate of an information carrier that can be inscribed with a constant information density. The space modulation period is then selected to correspond with the variation of the angular velocity, so that the period multiplied by the angular velocity divided by the radial distance is constant. For verifying the exact winding after a jump, it is advantageous to repeat the winding information several times per winding in winding information frames. Such a winding information frame must be individually decodable. This also provides good protection against local damages. It is attractive to number the winding information frames successively by an angle number, so that always a (coarse) indication is available of the angular position relative to the imaginary line 8, where the winding numbers advance in the case of a helical track. There should be noted that the blank information carrier according to the invention can be manufactured in a simple manner because not a high degree of accuracy with respect to the position of the winding information or winding information frames is necessary, in contrast to, for example, the synchronization symbols in the pregroove on the known information carrier. Neither is it necessary to record addresses or sector subdivisions such as are customary for known optical information carriers for storing data.

FIG. 2 shows an information carrier according to the invention, having reference marks 21, 22. During writing, an information block is positioned on the information carrier in a specific winding 3 starting from a particular angular position relative to a reference angular position denoted by the reference marks 21, 22. The position of an information block is to be determined as accurately as possible. Consequently, the blocks can be written small mutual distances apart (see FIG. 3, buffer 34) in a random writing order. For this purpose, the information carrier is first provided with at least one reference mark 21 to indicate the reference angular position. The reference mark 21 is written by the write head which also writes the information blocks. Preferably, the reference mark 21 is positioned at a known angle relative to the imaginary line 8 on which the winding numbers leap. The reference mark 21 may be recorded at a random position of the information carrier, provided that also information is recorded denoting this position relative to the reference angular position. It is attractive to record further reference marks 22 spread over the information carrier and to provide information about the position of that particular reference mark 22 relative to the reference angular position. In consequence, when reference mark 22 is read out, reference mark 21 may be found more rapidly, because there is no need for waiting any further until the information carrier 1 has made a full turn. The information carrier can be used even when damaged at the first reference mark 21 position. A slight deviation in the reference angular position when different reference marks are used may be achieved by determining the position of one or more reference marks 22 subsequent to their being written by, for example, repeatedly measuring the period of time between all the reference marks. The information about the accurately measured position may be stored in reference blocks which are to be recorded separately.

For positioning a random information block, the desired radial position and the desired angular position are to be known. For this purpose, an address is assigned to each information block, which address is preferably included in a header in the information block itself. The address may comprise the desired position. It is advantageous to give the information blocks a simple address, for example, a block number which successively numbers the information blocks. The blocks can then be positioned in a fixed pattern per winding, for example, with a fixed number of blocks per winding. The desired position can be derived from a block number. The ratio between the length of the data area of a block and the space covered by, for example, a buffer between the blocks should be as large as possible. Preferably, long blocks should be selected so that an error-correcting code may be applied which is capable of correcting rather long burst errors. Higher information density areas on the information carrier are provided by information blocks in windings located near the outer rim of carrier 1. For example, the information carrier can be subdivided into a number of concentric zones wherein for each zone an equal number of information blocks per winding 3 are provided with less zones when moving radially inwardly. A constant information density may be achieved by writing information blocks of the same length and at equal distances apart from each other in the direction of the track. On an information carrier having a track of known dimensions, the winding and angular position at which an information block starts based on a particular block number can be determined. It is therefore important that track dimensions be standardized. Consequently, the start of an information block can be determined based on block number without resorting to calculation of real dimensions.

Figure 3:
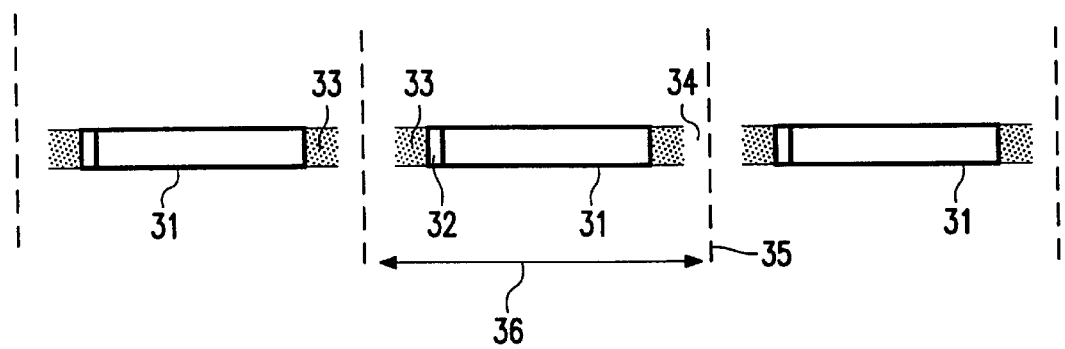
FIG. 3 shows successive information blocks with lead-in symbols.

FIG. 3 shows diagrammatically several information blocks 31 which are recorded successively in the track. For each block a space 36 is reserved between the block boundaries 35. This space is such that with the maximum tolerances the information blocks stay within these block boundaries and thus never overlap during positioning of the blocks. With normal and thus smaller tolerances, a buffer 34 of unwritten surface remains blank. In determining the maximum tolerances variations in the writing speed, speed of rotation, eccentricity of the reading/writing apparatus and inaccuracy in locating the positions of the reference marks 21, 22 are taken into account. The eccentricity of the information carrier itself does not play any role because this eccentricity is the same both during reading and writing, and is thus cancelled. As a result of the tolerances, an area 33 containing residual information from previous information blocks which had previously been recorded in the same space 36 may develop before and after an information block 31. It is advantageous to let the information blocks 31 be preceded by lead-in symbols 32. The means for reading and recovering information from the information pattern recorded in the track may then be adjusted while these lead-in symbols are being read out. For example, the presence of symbols is first detected followed by tuning of: an automatic gain control (AGC), adjustment of the detector level (in the slicer) and block recovery (in a Phase-Locked Loop). Optimal performance of the reading operation can be achieved even when information patterns of the information blocks vary in quality due to, for example, having recorded information blocks using different apparatus. Once a block has been completely read out, the AGC, slicer and PLL remain frozen until the beginning of the next series of lead-in symbols is detected. In this respect there is observed that, although the tuning may commence as early as the area 33 with residual information from a previous information block, the time of tuning the AGC, the slicer and the PLL can always be selected such that these elements are tuned to the available block within the period of the lead-in symbols. The area 32 of the lead-in symbols is selected such that the maximum variation in the beginning of the writing of an information block 31 is always smaller, so that never a beginning of a previous information block containing a previous header with address information is found in area 33. Besides the address, the header preferably includes the winding number, so that when information is written in a previously written area of the information carrier 1, the winding number can also be determined or verified by the reading of information blocks.

Figure 4:
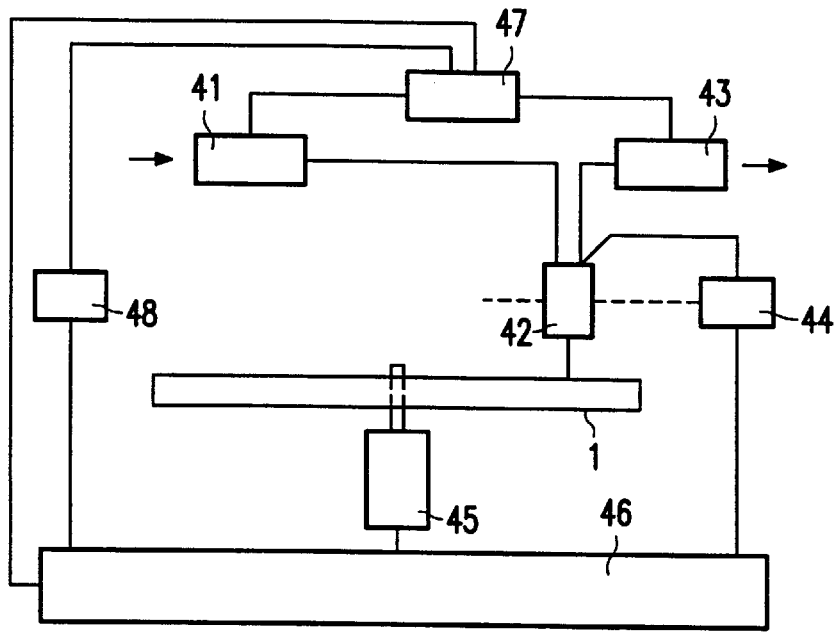
FIG. 4 shows an apparatus for reading and writing information blocks.

FIG. 4 shows an apparatus for reading and writing information blocks on a disc-shaped information carrier which is, for example, optically, magneto-optically or magnetically inscribable. The apparatus comprises driving means 45 for causing the information carrier 1 to rotate, and comprises a read/write head 42 for scanning the track formed on the information carrier by the servotrack. The read/write head 42 is positioned on the track in radial direction by servo means 44. According to the known tracking and focusing methods the read/write head scans the track and, in addition, the servo signals have a modulation, for example, caused by wobble in the pregroove. The servosignal is demodulated and the disc information encoded therein is recovered in the servo means 44 and fed to the system controller 46. An extensive description of the inscribable CD system which is thus provided with disc information, can be found in U.S. Pat. Nos. 4,901,300 and 5,187,699. The available information is subdivided into blocks in the writing means 41 and converted into a writing signal for the read/write head 42. The writing means 41 comprise, for example, an error coder and a channel coder. During the reading operation the signal from the read/write head 42 is reconverted into information in the reading mens 43, for example, which comprise a channel decoder and an error corrector. The apparatus comprises reference means 47 for reading and writing reference marks and angle measuring means 48 for determining the actual angular position. The system controller 46 controls these two means and, in addition, the servo means 44, the writing means 41, the reading means 43 and the driving means 45, and is arranged for executing the procedures to be described hereafter.

After an information carrier 1 is inserted into the apparatus, an attempt is made to read one or more reference marks at a predefined radial distance via the reading means 43 and the read/write head 42. If no reference marks are found, an angle orientation of the servotrack is derived from the winding information, for example, the imaginary line 8 (see FIG. 1), where the winding information of a new winding starts. A first reference mark 21 (see FIG. 2) is now written at a predefined position relative to the servotrack. A radial position on the outer edge is advantageous in that a linear or time error causes a small angle error to be found when the reference mark is detected. Subsequently, one or more further reference marks 22 may be written, while each time a reference mark is recorded, its angular position relative to the first reference mark 21 is recorded. In an improved embodiment for the means 47, the angular position of the remaining reference marks 22 is measured carefully, for example, by recurrently measuring the time between the reading of the first reference mark 21 and each of the remaining reference marks 22 and taking the mean value. Then the mean value is separately recorded in reference blocks. When an information carrier that has reference blocks is read out, they can be read out once and the exact position of the remaining reference marks can be stored in the system controller 46.

Prior to the writing of an information block, first the reference mark 21 is read out and the rotation period of the information carrier is determined. If the first reference mark 21 is illegible due to damage or if another reference mark 22 can be read out first, the latter is considered the starting point. The actual angular position may be determined by counting the angle measuring means 48 over time with a measuring frequency starting from the reading of the reference mark by reading means 47. The actual angular position is then equal to the measured time divided by the period of rotation, increased by the angular position of the reference mark 21, 22 relative to the reference angular position. If the information carrier 1 rotates at a speed that is exactly known, for example, by a stepping motor as driving means 45, or a motor driven in sync with a measuring frequency, the actual angular position can be determined during various rotations without loss of accuracy by always starting the counted time from 0 again after a full rotation. A large number of writing or reading actions may then be carried out without intermittently reading a reference mark again. The rotation period of the information carrier 1 may be accurately determined, as required, by recurrently reading the reference mark 21, 22 or by measuring the modulation frequency of the wobble. In a radial direction, the read/write head 42 may be positioned by counting the windings from the known winding up to the desired winding in the case of a jump. When the read/write head 42 arrives at the desired winding, the winding can be verified by a decoding of the winding information. Initially, the read/write head 42 may also be positioned coarsely by bringing it to a certain distance from the point of rotation and reading the winding number, after which the accurate positioning can be effected by counting several more windings to the inside or outside. After radial positioning, the writing of a block is started so that the block is written at the desired angular position relative to the reference mark 21. In the case of uninterrupted writing actions, the radial position can be monitored by counting the rotations.

After an information block has been similarly positioned, it can also be read out. The winding may be verified by directly reading the information block; the information block is then to contain a header with address information.

Figure 5:
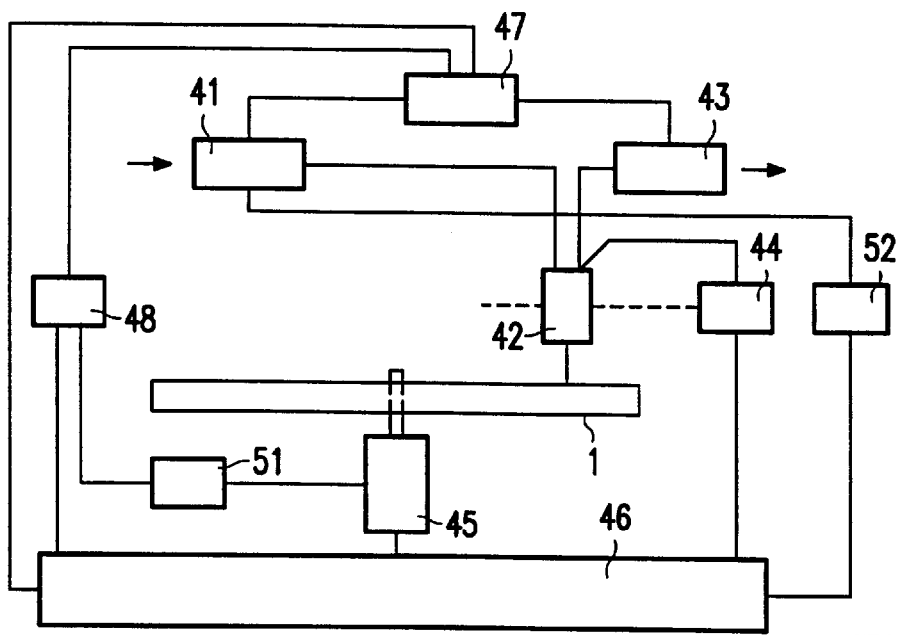
FIG. 5 shows an apparatus comprising pulse generation means (in the drawings, like elements carry like reference numbers.)

FIG. 5 shows a different embodiment for an apparatus according to the invention, comprising means 51 for generating pulses. At one or more fixed instants, pulses are generated for each rotation. The pulses may be derived, for example, from the driving means 45. For the rotation speed control these means already often comprise a tachogenerator which generates a fixed number of pulses per rotation. The means 51 may also include a separate pick-up element for generating pulses, such as, for example, a light-sensitive cell which is exposed once or various times per rotation. The pulses are applied to the angle measuring means 48 which determine the reference angular position relative to the pulses before the information blocks are recorded. The position of the pulses relative to the reference marks 21, 22 are first determined. The actual angular position relative to the pulses can then be determined. As a result, the reference mark need no longer be read out and there is always an accurate actual angular position available. Preferably, the actual angular position should be derived from the most recently occurring pulse. The more pulses per rotation, the smaller the uncertainty of actual angular position caused by variations in the speed of rotation. A high reliability as to the actual angular position during writing may be obtained by verifying the occurrence of the pulses relative to the counted time. If the occurrence of a pulse differs too much from when the pulse is expected to occur, the writing operation may be halted.

It is important for the pulses to always occur at the same angle during each rotation; the angle relative to the information carrier 1 is unimportant. After a particular period of time, the position of the pulses may shift slightly caused by, for example, temperature effects. To compensate for such shift, the apparatus may recalibrate the actual angular position through rewriting of the reference marks.

Alternatively, the apparatus can also include control means 52 for controlling the writing speed in dependence on the winding information, so that the information blocks are written with a constant information density. The radial distance to the point of rotation can be simply derived from the winding information, for example, if the windings are numbered successively and the distance between the windings and the radial distance of the first winding are known. It is advantageous to have the information carrier rotate at constant speed, because the speed need not be adapted then in the event of a jump of the read/write head. By increasing the writing speed, in this case proportionally to the increase of the radial distance, the linear information density remains constant and an information block always needs a space 36 of the same length. In this manner a maximum amount of information can be written on the information carrier. For generating a write clock which is applied to the writing means 41, control means 52 may comprise, for example, a VCO (Voltage-Controller Oscillator). This voltage-controlled oscillator is controlled by the system controller 46 with a voltage derived from the radial distance. High accuracy of the generated write clock is achieved by calibrating the VCO prior to the writing operation, preferably by determining the necessary control voltage for various known frequencies. If an apparatus has a variable speed of rotation, the adaptation of the writing speed may be tuned thereto, so that the information density remains constant. It is also possible to subdivide the information carrier into a number of concentric tracks within which the write clock is fixed and in which the write clock increases from one track to the next. The write clock may then be generated, for example, by a Frequency Synthesizer for which a known frequency of a crystal oscillator is coupled according to an adjustable dividing factor (M:N) to a VCO and is thus converted into the desired write clock.

I claim:

1. A system for storing and reproducing information including a disc-shaped information carrier and an apparatus, comprising means for reading and writing information blocks on a continuous track intended for recording on the information carrier, which track is arranged according to a helical or concentric pattern of windings and is determined by a servotrack on the information carrier, the apparatus including driving means for causing the information carrier to rotate, and a read/write head for scanning the track, and which servotrack has a periodic modulation in which disc information is encoded, characterized in that the disc information comprises winding information in windings which identifies each particular winding of the track, the apparatus also including means for reading and writing through the read/write head at least a first reference mark on the information carrier which reference mark is indicative of the location of a reference angular position, and means for determining an actual angular position relative to the reference angular position wherein the means for reading and writing are adapted for positioning the read/write head in a radial position as a function of the winding information and for effecting the start of the reading or writing operation in dependence on the actual angular position.

2. The system as claimed in claim 1, characterized in that the means for reading and writing the reference mark are adapted to reading and writing various reference marks on the information carrier, each reference mark comprising information indicating the position of that particular reference mark relative to the reference angular position.

3. The system as claimed in claim 2, characterized in that the means for reading and writing the reference mark are adapted for reading and writing reference blocks separately from the reference marks, which reference blocks comprise information indicating the position of the reference marks relative to the reference angular position.

4. The system as claimed in claim 1, characterized in that each of the information blocks contain a header having a block number which uniquely identifies that particular information block, and in that the apparatus further includes means for determining the winding and angular position of that particular information block on the information carrier based on the block number.

5. The system as claimed in claim 1, characterized in that the means for reading and writing the information blocks are adjusted to the writing of lead-in symbols prior to the information blocks and for tuning the reading means in dependence on the lead-in symbols prior to the reading of that particular information block.

6. The system as claimed in claim 1, the apparatus further including driving means for causing the information carrier to rotate and means for reading and writing through the read/write head at least a first reference mark which is indicative of the location of a reference angular position.

7. The system as claimed in claim 6, characterized in that the apparatus further includes means for generating one or more pulses per rotation and in that the means for determining the actual angular position are adapted to determining the actual angular position in dependence on a reference mark and the pulses.

8. The system as claimed in claim 6, characterized in that the apparatus further includes control means for controlling the writing velocity in dependence on the winding information so that the information blocks are written with a constant information density.

9. An optical information carrier having a continuous recording track which is arranged according to a helical or concentric pattern of windings and which is indicated by a servotrack having a periodic modulation with encoded modulated disc information, wherein the disc information includes radial position information of each winding identifying each winding of the track and an angle number indicating an angular position of a particular winding information frame for the track.

10. The optical information carrier as claimed in claim 9, further comprising one or more information blocks within the servotrack.

11. The optical information carrier as claimed in claim 9, characterized in that the period of modulation for any portion of the servotrack increases proportionally to the distance from that portion of the servotrack to a point about which the information carrier rotates.

12. The optical information carrier as claimed in claim 9, characterized in that the winding information contains various independently decodable winding information frames per winding, each winding information frame containing a winding number uniquely identifying that particular winding and an angle number indicating an angular position of that particular winding information frame, there being a correspondence among angle numbers in the winding information frames whose angular positions correspond.

13. The optical information carrier as claimed in claim 9, characterized in that the information carrier includes one or more reference marks indicative of the location of a reference angular position.

14. A method of writing information blocks on an optical information carrier as claimed in claim 13, characterized by recording the information blocks at positions along at least one or more radial directions on the carrier as a function of the servotrack and at an angular orientation as a function of said reference marks.

* * * * *